(12) United States Patent
Yin et al.

(10) Patent No.: US 9,304,299 B2
(45) Date of Patent: Apr. 5, 2016

(54) FOUR-PIECE ALL-ASPHERIC ADAPTER FISHEYE LENS

(71) Applicant: OmniVision Technologies, Inc., Santa Clara, CA (US)

(72) Inventors: Chuen-Yi Yin, New Taipei (TW); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 100 days.

(21) Appl. No.: 14/465,146

(22) Filed: Aug. 21, 2014

(65) Prior Publication Data
US 2016/0054547 A1  Feb. 25, 2016

(51) Int. Cl.
| | |
|---|---|
| G02B 3/02 | (2006.01) |
| G02B 13/18 | (2006.01) |
| G02B 9/12 | (2006.01) |
| G02B 13/06 | (2006.01) |
| G02B 9/34 | (2006.01) |
| G02B 27/00 | (2006.01) |
| G03B 17/56 | (2006.01) |

(52) U.S. Cl.
CPC *G02B 13/06* (2013.01); *G02B 9/34* (2013.01); *G02B 13/18* (2013.01); *G02B 27/0025* (2013.01); *G03B 17/565* (2013.01)

(58) Field of Classification Search
CPC ........ G02B 13/004; G02B 9/34; G02B 13/04; G02B 13/18; G02B 13/0035; G02B 9/12; G02B 9/16; G03B 17/565; G03B 17/14
USPC ......... 359/648, 672–675, 715, 716, 753, 781, 359/784
See application file for complete search history.

(56) References Cited

U.S. PATENT DOCUMENTS

| | | | | |
|---|---|---|---|---|
| 3,734,600 A | * | 5/1973 | Shimizu | G02B 13/06 359/723 |
| 6,128,145 A | * | 10/2000 | Nagaoka | H04N 7/183 359/749 |
| 6,504,655 B2 | | 1/2003 | Shibayama | |
| 7,023,628 B1 | * | 4/2006 | Ning | G02B 13/06 359/680 |

(Continued)

OTHER PUBLICATIONS

Symmons, et al. "Molded Optics: Precision Molded Glass Challenges Plastic Optics," retrieved from http://www.laserfocasworld.com/articles/2011/07/molded-optics-precision-molded-glass-challenges-plastic-optics.html Jul. 1, 2011.

(Continued)

*Primary Examiner* — Evelyn A Lester
(74) *Attorney, Agent, or Firm* — Lathrop & Gage LLP

(57) ABSTRACT

A four-piece all-aspheric adapter fisheye lens includes a negative meniscus lens, a biconcave lens, a positive meniscus lens, and a biconvex lens. The biconcave lens is between the negative meniscus lens and the positive meniscus lens; the positive meniscus lens is between the biconcave lens and the biconvex lens. The negative meniscus lens, the biconcave lens, the positive meniscus lens, and the biconvex lens are coaxial and arranged with an exit pupil to cooperatively generate an image with a camera lens that has greater field of view than the camera lens alone when the exit pupil is coplanar and coaxial with an entrance pupil of the camera lens. Each of the negative meniscus lens, the biconcave lens, the positive meniscus lens, and the biconvex lens has an aspheric object-side surface and an aspheric image-side surface.

17 Claims, 14 Drawing Sheets

(56) References Cited

U.S. PATENT DOCUMENTS

| | | | |
|---|---|---|---|
| 8,134,787 B2 * | 3/2012 | Saitoh | G02B 13/06 359/715 |
| 8,279,544 B1 | 10/2012 | O'Neill | |
| 8,570,660 B2 | 10/2013 | Takemoto et al. | |
| 2006/0274433 A1 * | 12/2006 | Kamo | G02B 15/177 359/793 |
| 2007/0139793 A1 * | 6/2007 | Kawada | G02B 13/06 359/740 |
| 2008/0239517 A1 * | 10/2008 | Mori | G02B 9/34 359/781 |
| 2009/0080093 A1 * | 3/2009 | Ning | G02B 13/06 359/753 |
| 2010/0246029 A1 * | 9/2010 | Asami | G02B 13/004 359/708 |
| 2011/0085245 A1 | 4/2011 | Kim | |
| 2012/0113532 A1 * | 5/2012 | Lee | G02B 13/06 359/753 |
| 2014/0128673 A1 | 5/2014 | Cheng | |

OTHER PUBLICATIONS

Pontinen, "Study on Chromatic Aberration of Two Fisheye Lenses," The Intl Archives of Photogrammetry, Remote Sensing and Spatial Information Services, vol. XXXVII, Part B3a, Beijing 2008.

* cited by examiner

| | | 411 | 412 | 413 | 414 | 415 | 416 | 404 | 406 | 408 | 410 |
|---|---|---|---|---|---|---|---|---|---|---|---|
| | | radius $r_c$ (mm) | thickness (mm) | $n_D$ ($\lambda$=589 nm) | Abbe Number | conic $k$ | aspheric coefficient | | | |
| | | | | | | | | 4th-order term $\alpha_4$ | 6th-order term $\alpha_6$ | 8th-order term $\alpha_8$ | 10th-order term $\alpha_{10}$ |
| surface | object | $\infty$ | -- | -- | -- | -- | -- | -- | -- | -- | -- |
| | 311 | 21.071 | 0.551 | 1.543 | 57 | -0.053 | -5.8015E-04 | 2.2653E-05 | -- | -- |
| | 312 | 3.078 | 1.789 | | | -0.013 | -9.1296E-03 | 8.0853E-04 | -8.3278E-05 | -- |
| | 321 | -41.543 | 0.733 | 1.543 | 57 | -176.992 | -2.2302E-03 | -6.2052E-05 | -- | -- |
| | 322 | 3.126 | 0.532 | | | -0.063 | 2.8471E-03 | -8.3299E-04 | 6.8817E-05 | -- |
| | 331 | 5.386 | 2.114 | 1.632 | 23 | -7.015 | 1.6435E-04 | -7.8896E-06 | 0.0000E+00 | -- |
| | 332 | 16.782 | 0.174 | | | -184.843 | -2.4209E-03 | -2.0615E-05 | -- | -- |
| | 341 | 20.303 | 1.941 | 1.510 | 57 | -197.957 | -7.6131E-04 | 3.5204E-04 | -- | -- |
| | 342 | -4.746 | 0.500 | | | 11.308 | 5.7934E-03 | 2.3631E+06 | -2.6596E-02 | 1.7262E-02 |
| | 351 | $\infty$ | 2.800 | (ideal lens) | | -- | -- | -- | -- | -- |
| | 352 | $\infty$ | -- | -- | -- | -- | -- | -- | -- | -- |

FIG. 4

| surface | radius $r_c$ (mm) | thickness (mm) | $n_D$ ($\lambda$=589 nm) | Abbe Number | conic $k$ | 4th-order term $\alpha_4$ | 6th-order term $\alpha_6$ | 8th-order term $\alpha_8$ | 10th-order term $\alpha_{10}$ |
|---|---|---|---|---|---|---|---|---|---|
| object | ∞ | ∞ | -- | -- | -- | -- | -- | -- | -- |
| 911 | 19.591 | 0.570 | 1.543 | 57 | -1.422 | -6.8501E-04 | 2.5042E-05 | -- | -- |
| 912 | 2.977 | 1.842 | | | -0.044 | -9.5461E-03 | 9.2518E-04 | -1.0111E-04 | -- |
| 921 | -30.653 | 0.787 | 1.543 | 57 | 20.979 | -3.1450E-03 | 0.0000E+00 | -- | -- |
| 922 | 2.755 | 0.449 | | | -0.032 | 4.6124E-03 | -1.0408E-03 | -- | -- |
| 931 | 4.110 | 2.083 | 1.585 | 30 | -1.148 | 3.0511E-03 | 1.0880E-04 | -- | -- |
| 932 | 20.739 | 0.170 | | | -188.697 | -1.3766E-03 | -- | -- | -- |
| 941 | 20.833 | 1.932 | 1.523 | 52 | -191.456 | -1.9841E-03 | 2.6812E-04 | -- | -- |
| 942 | -5.090 | 0.500 | | | 18.827 | 6.3574E-03 | 3.3452E-02 | -3.4900E-02 | 2.5404E-02 |
| 951 | ∞ | 2.800 | (ideal lens) | | -- | -- | -- | -- | -- |
| 952 | ∞ | 0.000 | -- | -- | -- | -- | -- | -- | -- |

FIG. 10

FOUR-PIECE ALL-ASPHERIC ADAPTER FISHEYE LENS

BACKGROUND

Digital camera modules are used in a variety of consumer, industrial and scientific imaging devices to produce still images and/or video. These devices include mobile telephones, digital still image and video cameras, and webcams. The field of view of a camera module is typically between 60 degrees and 70 degrees. The field of view can be increased by attaching an adapter lens in front of the camera module. The resulting imaging system of the adapter lens and camera module has a wider field of view than the camera module alone. A wide field of view is valuable in applications such as autonomous vehicle navigation, car parking monitor systems, and gesture recognition.

SUMMARY OF THE INVENTION

According to an embodiment, a four-piece all-aspheric adapter fisheye (FPAAAF) lens is provided. The FPAAAF lens includes a negative meniscus lens, a biconcave lens, a positive meniscus lens, and a biconvex lens. The biconcave lens is between the negative meniscus lens and the positive meniscus lens; the positive meniscus lens is between the biconcave lens and the biconvex lens. The negative meniscus lens, the biconcave lens, the positive meniscus lens, and the biconvex lens are coaxial and arranged with an exit pupil to cooperatively generate an image with a camera lens that has greater field of view than the camera lens alone when the exit pupil is coplanar and coaxial with an entrance pupil of the camera lens. Each of the negative meniscus lens, the biconcave lens, the positive meniscus lens, and the biconvex lens has an aspheric object-side surface and an aspheric image-side surface;

According to an embodiment, the negative meniscus lens has a thickness D1 and the object-side surface with a semi-diameter S1, wherein ratio S1/D1 satisfies 9.0<S1/D1<9.8 for enabling a wide field of view. The negative meniscus lens has a focal length F1 and the object-side surface having a radius of curvature R1, wherein ratio F1/R1 satisfies −0.4<F1/R1<−0.3 for reducing distortion. The object-side surface of the biconcave lens has a radius of curvature R3; the image-side surface of the biconcave lens has a radius of curvature R4, wherein ratio R4/R3 satisfies −0.12<R4/R3<−0.04 for reducing field curvature. The object-side surface of the positive meniscus lens has a positive radius of curvature R5 and the image-side surface of the positive meniscus lens has a positive radius of curvature R6, wherein R6 exceeds R5 for reducing chromatic aberration. The object-side surface of the biconvex lens has a radius of curvature R7 and the image-side surface of the biconvex lens has a radius of curvature R8, wherein ratio R8/R7 satisfies −0.28<R8/R7<−0.2 for reducing longitudinal aberration. The negative meniscus lens and biconcave lens each have an Abbe number exceeding 55, and the positive meniscus lens has an Abbe number less than 35, for reducing chromatic aberration.

BRIEF DESCRIPTION OF THE FIGURES

FIG. 4 shows exemplary parameters for the FPAAAF lens of FIG. 3.

FIG. 10 shows exemplary parameters for the fisheye lens of FIG. 9.

DETAILED DESCRIPTION

Figure 1:
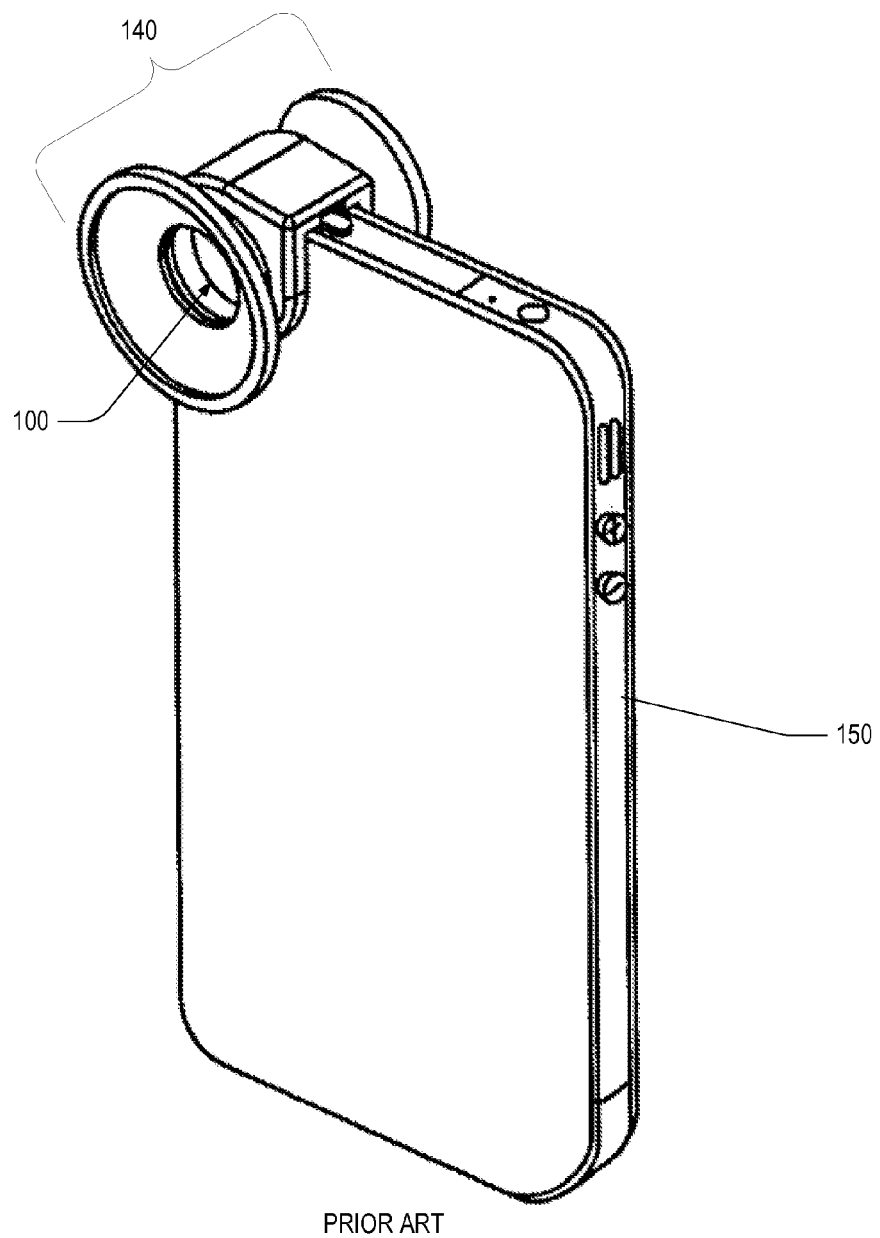
FIG. 1 shows a prior art adapter fisheye lens within an adapter housing that is attached to a mobile phone.

FIG. 1 shows a prior-art adapter fisheye lens 100 within a fisheye lens adapter housing 140 that is attached to a mobile phone 150. Mobile phone 150 includes an on-chip camera with a standard field of view. Fisheye lens adapter housing 140 is positioned on mobile phone 150 such that the optic axis of adapter fisheye lens 100 and the optic axis of the on-chip phone camera are coaxial.

Prior-art adapter fisheye lens 100 includes optical elements made of optical glass and/or plastic, for example, one spherical glass lens combined with one aspherical plastic lens. The range of Abbe numbers $V_D$ of optical glasses exceeds that of optical plastics. Thus, the minimum chromatic aberration achievable in compound fisheye lenses with only spherical glass surfaces is lower than a similar lens formed from plastic. However, compared to an all-plastic lens system, the use of a glass in a fisheye lens incurs increased material costs, fabrication costs, weight, volume, and restrictions on manufacturing lens shape.

An all-plastic compound fisheye lens described hereinbelow achieves the performance benefits of glass with the size and weight advantages of plastic. Using aspherical surfaces, rather than just spherical surfaces, more degrees of freedom are achieved when optimizing an all-plastic fisheye lens design to meet desired performance specifications. These performance specifications include minimizing aberrations such as longitudinal aberration (longitudinal spherical aberration), image distortion, field curvature, and lateral color. Optimizing a lens design per these performance metrics is constrained by the relatively narrow range of Abbe numbers in optical plastics, and the benefits of minimizing the number of plastic elements.

This disclosure specifically provides four-piece all-aspheric adapter fisheye (FPAAAF) lenses, wherein the Abbe numbers of each optical element in the FPAAAF corresponds to an existing optical plastic. The FPAAAF lens may be designed to fit into fisheye lens adapter housings, such as fisheye lens adapter housing 140 of FIG. 1.

Figure 2:
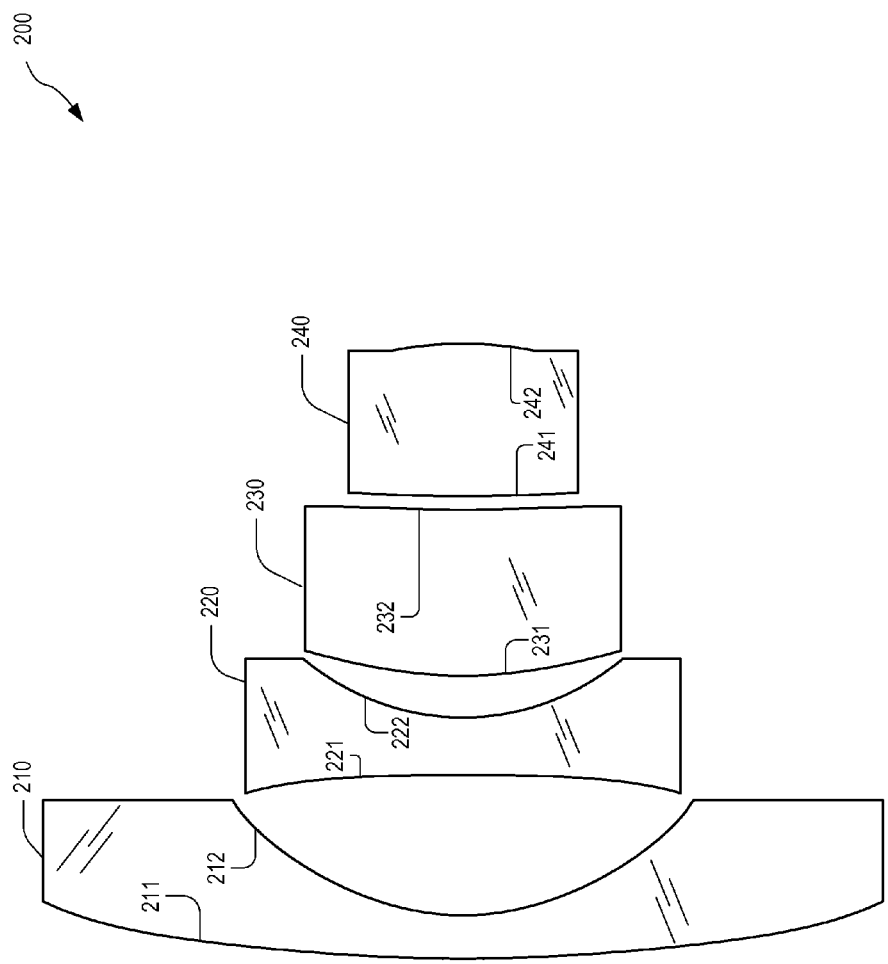
FIG. 2 is a cross-sectional view of a four-piece all-aspheric adapter fisheye (FPAAAF) lens, in an embodiment.

FIG. 2 is a cross-sectional view of one FPAAAF lens 200. FPAAAF lens 200 includes a negative meniscus lens 210, a biconcave lens 220, positive meniscus lens 230, and a biconvex lens 240. Negative meniscus lens 210 includes an object-side surface 211 and an image-side surface 212. Biconcave lens 220 includes an object-side surface 221 and an image-side surface 222. Positive meniscus lens 230 includes an object-side surface 231 and an image-side surface 232. Biconvex lens 240 includes an object-side surface 241 and an image-side surface 242. In a first embodiment of FPAAAF lens 200, each of the surfaces 211, 212, 221, 222, 231, 232, 241, and 242 are aspheric.

Negative meniscus lens 210, biconcave lens 220, positive meniscus lens 230, and biconvex lens 240 are each singlet lenses. In an embodiment of FPAAAF lens 200, one or more of negative meniscus lens 210, biconcave lens 220, positive meniscus lens 230, and biconvex lens 240 may be non-singlet lenses without departing from the scope hereof. FPAAAF lens 200 may be dimensioned so that it replaces adapter fisheye lens 100 in fisheye lens adapter housing 140, FIG. 1.

Referring to negative meniscus lens 210, the semi-diameter of object-side surface 211 is S1 and the on-axis thickness of negative meniscus lens 210 is D1. Embodiments of negative meniscus lens 210 may have a quotient S1/D1 between 9.0 and 9.8. Limiting the quotient S1/D1 to this range enables a wide field of view in imaging systems that include FPAAAF lens 200. For example, imaging systems 350 and 950 discussed herein have respective fields of view exceeding 170°.

Negative meniscus lens 210 has a focal length F1 and a radius of curvature R1 of object-side surface 211. Embodiments of negative meniscus lens 210 may have a quotient F1/R1 between −0.4 and −0.3. Limiting the quotient F1/R1 to this range allows for correcting distortion in imaging systems that include FPAAAF lens 200. For example, at field angles between 0° and 90°, imaging systems 350 and 950 discussed herein have respective distortions less than 10%.

Referring to biconcave lens 220, object-side surface 221 has radius of curvature R3 and image-side surface 222 has radius of curvature R4. Embodiments of biconcave lens 220 may have a quotient R4/R3 between −0.12 and −0.04. Limiting the quotient R4/R3 to this range allows for correcting field curvature in imaging systems that include FPAAAF lens 200. For example, at field angles between 0° and 90°, imaging systems 350 and 950 discussed herein have respective field curvatures less than 0.06 mm.

Referring to positive meniscus lens 230, object-side surface 231 has radius of curvature R5 and image-side surface 232 has radius of curvature R6. In embodiments of positive meniscus lens 230, R6>R5>0, which ensures that lens 230 is a positive lens. Requiring R6>R5>0 allows for reducing chromatic aberration in imaging systems that include FPAAAF lens 200, such as imaging systems 350 and 950 discussed herein. For example, the transverse chromatic aberration (lateral color error) of imaging systems 350 and 950 discussed herein is less than the Airy disk radius.

Referring to biconvex lens 240, object-side surface 241 has radius of curvature R7 and image-side surface 242 has radius of curvature R8. Embodiments of biconvex lens 240 may have a quotient R8/R7 between −0.28 and −0.20. Limiting the quotient R7/R8 to this range allows for correcting longitudinal aberration in imaging systems that include FPAAAF lens 200, such as imaging systems 350 and 950 discussed herein.

In FPAAAF lens 200, negative meniscus lens 210 and biconcave lens 220 each have Abbe number $V_D$>55. Positive meniscus lens 230 has an Abbe number $V_D$<35. These constraints on Abbe numbers allow for correcting chromatic aberration in imaging systems that include FPAAAF lens 200, such as imaging systems 350 and 950 discussed herein.

The *Handbook of Plastic Optics* (Wiley-VCH, publisher) lists examples of transparent optical materials with $V_D$>55. These include polymethyl methacrylate (PMMA), and cycloolefin polymers, for example, APEL™ 5014DP, TOPAS® 5013, and ZEONEX® 480R. The lens material with $V_D$>55 may be plastic, glass, or any non-plastic optical material without departing from the scope hereof.

The *Handbook of Plastic Optics* lists examples of transparent optical materials with $V_D$<35. These include PANLITE®, a brand-name polycarbonate, Udel® P-1700, a brand-name polysulfone, and OKP-4, a brand-name optical polyester. The lens material with $V_D$<35 may be plastic, glass, or any non-plastic optical material without departing from the scope hereof.

Lenses 210, 220, 230, and 240 may be formed by injection molding or other methods known in the art. Embodiments of lenses 210, 220, 230, and 240 formed of glass may be formed by precision glass molding (also known as ultra-precision glass pressing) or other methods known in the art.

FPAAAF Lens

Example 1

Figure 3:
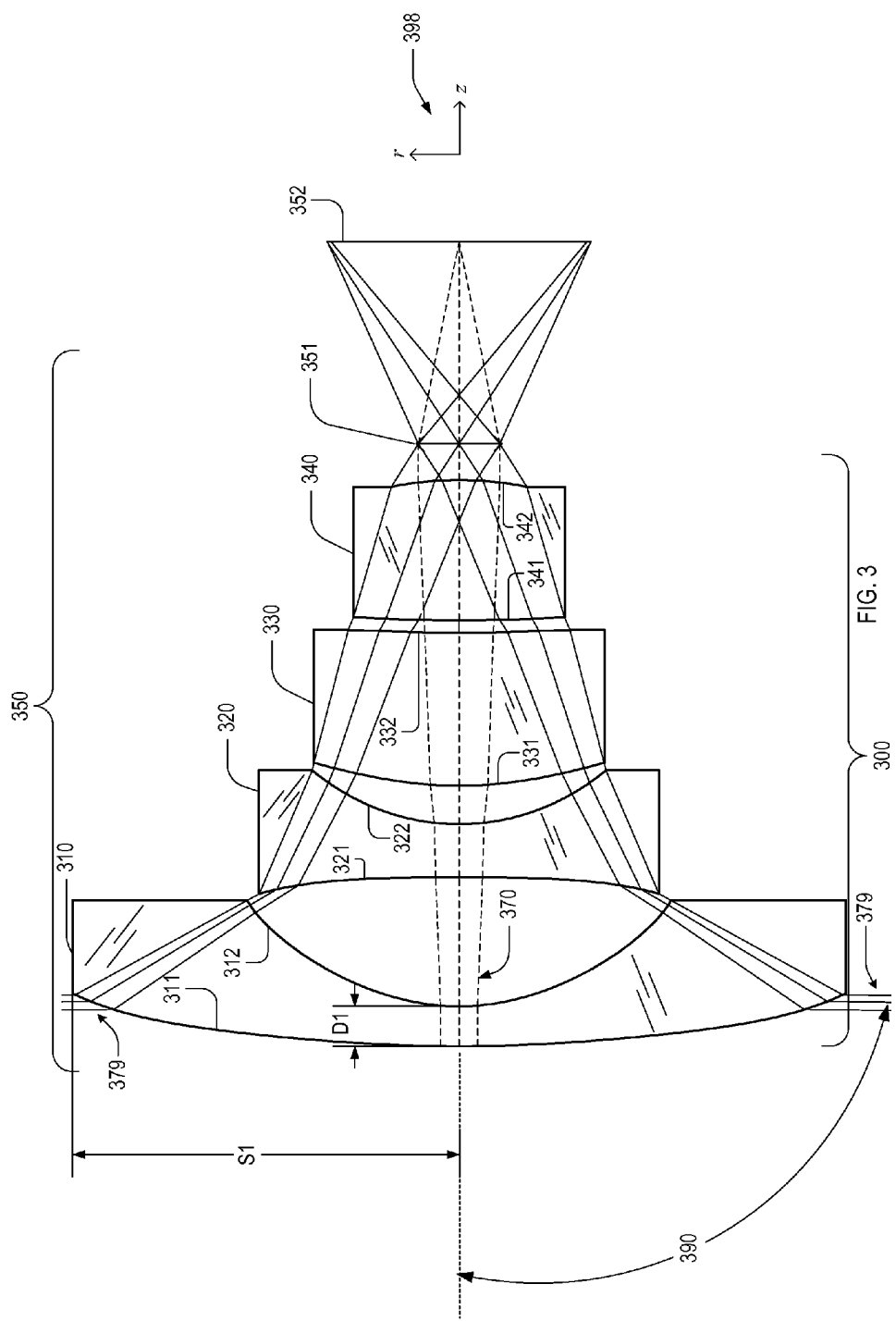
FIG. 3 is a cross-sectional view of a FPAAAF lens functioning as an adapter lens for an imaging system, in an embodiment.

FIG. 3 is a cross-sectional view of a FPAAAF lens 300 functioning as an adapter lens for an imaging system, e.g., for a standard non-fisheye imaging system included in mobile phone 150, FIG. 1. FPAAAF lens 300 is an embodiment of FPAAAF lens 200. FPAAAF lens 300 includes a negative meniscus lens 310, a biconcave lens 320, a positive meniscus lens 330, and a biconvex lens 340 that are analogous to negative meniscus lens 210, biconcave lens 220, positive meniscus lens 230, and biconvex lens 240 of FPAAAF lens 200. Negative meniscus lens 310 includes an object-side surface 311 and an image-side surface 312. Biconcave lens 320 includes an object-side surface 321 and an image-side surface 322. Positive meniscus lens 330 includes an object-side surface 331 and an image-side surface 332. Biconvex lens 340 includes an object-side surface 341 and an image-side surface 342. In FPAAAF lens 300, each of the surfaces 311, 312, 321, 322, 331, and 332 are aspheric.

Specifically, FPAAAF lens 300 is shown coupled with a camera lens 351 of the standard non-fisheye imaging system such that, collectively, FPAAAF lens 300 and camera lens 351 cooperatively form an image at image plane 352.

FPAAAF lens 300 is variably locatable with respect to a camera lens 351. In FIG. 3, the entrance pupil of camera lens 351 is located at the exit pupil of FPAAAF lens 300, resulting in an imaging system 350. In imaging system 350, the entrance pupil of camera lens 351 and the exit pupil of FPAAAF lens 300 are coaxial and coplanar.

Camera lens 351 is, for example, an imaging lens of a reflowable camera module mounted on a printed circuit board (PCB) of an imaging device such as a mobile phone. But camera lens 351 may alternatively be an imaging lens of other cameras known in the art without departing from the scope hereof; examples include point-and-shoot cameras, compact system cameras, and single-lens reflex cameras. Such cameras may capture still images, video, or both, and be either digital or analog.

For the purpose of characterizing the aberrations caused by FPAAAF lens 300, camera lens 351 is modeled as an aberration-free "perfect lens" with a 66° field of view. However, camera lens 351 may include aberrations and have a different field of view without departing from the scope hereof.

Imaging system 350 is shown with ray traces of ray pencils 370 and 379 computed and displayed by the Zemax® Optical Design Program. Ray pencil 370 and ray pencil 379 propagate from the center and edge of the scene, respectively, through FPAAAF lens 300 and camera lens 351, and focus at image plane 352. Ray pencil 370 has a ray angle of zero. Ray pencil 379 has a ray angle 390 equal to 90°. Being axially symmetric, imaging system 350 has a field of view that is twice ray angle 390, or 180°.

FIG. 4 shows exemplary parameters of each surface of FPAAAF lens 300. Surface column 411 denotes surfaces 311, 312, 321, 322, 331, 332, 341, 342, camera lens 351, and image plane 352 shown in FIG. 3. Column 414 lists the material's refractive index $n_D$ at $\lambda$=589.3 nm, and column 415 lists the corresponding Abbe numbers $V_D$. Negative meniscus lens 310 has refractive index $n_D$=1.543, Abbe number $V_D$=57, and includes object-side surface 311 and image-side surface 312. Biconcave lens 320 has refractive index $n_D$=1.543, Abbe number $V_D$=57, and includes object-side surface 321 and image-side surface 322. Positive meniscus lens 330 has refractive index $n_D$=1.632, Abbe number $V_D$=23, and includes object-side surface 331 and image-side surface 332. Biconvex lens 340 has refractive index $n_D$=1.510, Abbe number $V_D$=57, and includes object-side surface 341 and image-side surface 342.

In FPAAAF lens 300, negative meniscus lens 310, biconcave lens 320, and biconvex lens 340 each have Abbe number $V_D$=57. This satisfies a condition that three—and only three—of the three lenses of FPAAAF lens 300 have an Abbe number $V_D$>55. The third lens in FPAAAF lens 300, positive meniscus lens 330, has Abbe number $V_D$=23, which satisfies a condition that one—and only one—of the three lenses of FPAAAF lens 300 has an Abbe number $V_D$<35.

Column 413 includes on-axis thickness values, in millimeters, between surfaces 311, 312, 321, 322, 331, 332, 341 and 342. Surfaces 311, 312, 321, 322, 331, 332, 341 and 342 are defined by surface sag $z_{sag}$, Eqn. 1.

$$z_{sag} = \frac{cr^2}{1 + \sqrt{1 - (1+k)c^2r^2}} + \sum_{i=1}^{N} \alpha_i r^i \quad (1)$$

In Eqn. 1, $z_{sag}$ is a function of radial coordinate r, where directions z and r are shown in coordinate axes 398, FIG. 3. In Eqn. 1, the parameter c is the reciprocal of the surface radius of curvature $r_c$: $c=1/r_c$. Column 412 of FIG. 4 lists $r_c$ values for surfaces 311, 312, 321, 322, 331, 332, 341, and 342. Parameter k denotes the conic constant, shown in column 416. Columns 404, 406, 408, and 410 contain values of aspheric coefficients $\alpha_4$, $\alpha_6$, $\alpha_8$, and $\alpha_{10}$, respectively. The units of quantities in FIG. 3 are consistent with $z_{sag}$ in Eqn. 1 being expressed in millimeters.

Referring to negative meniscus lens 310, FIG. 3, the semi-diameter of object-side surface 311 is S1 and the on-axis thickness of negative meniscus lens 310 is D1. The ratio S1/D1=9.7. Negative meniscus lens 310 has a focal length F1=−6.711 mm. Object-side surface 311 has radius of curvature R1=21.071 mm. The ratio F1/R1=−0.319.

Referring to biconcave lens 320, FIG. 3, object-side surface 321 has radius of curvature R3=−41.543 mm and image-side surface 322 has radius of curvature R4=3.126 mm. The ratio R4/R3=−0.0752.

Referring to positive meniscus lens 330, FIG. 3, object-side surface 331 has radius of curvature R5=5.386 and image-side surface 332 has radius of curvature R6 that exceeds R5 (R6=16.782).

Referring to biconvex lens 340, FIG. 3, object-side surface 341 has radius of curvature R7=20.303 and image-side surface 342 has radius of curvature R8=−4.746. The ratio R8/R7=−0.2338.

FIGS. 5-8 are plots of longitudinal aberration, f-Theta distortion, field curvature, and lateral color, respectively, of FPAAAF lens 300 within imaging system 350 as computed by Zemax®. Since camera lens 351 does not contribute to the aberrations shown in FIG. 5-8, the FPAAAF lens 300 is the source of these aberrations. The Zemax® User's Manual includes detailed definitions of each of these quantities.

Figure 5:
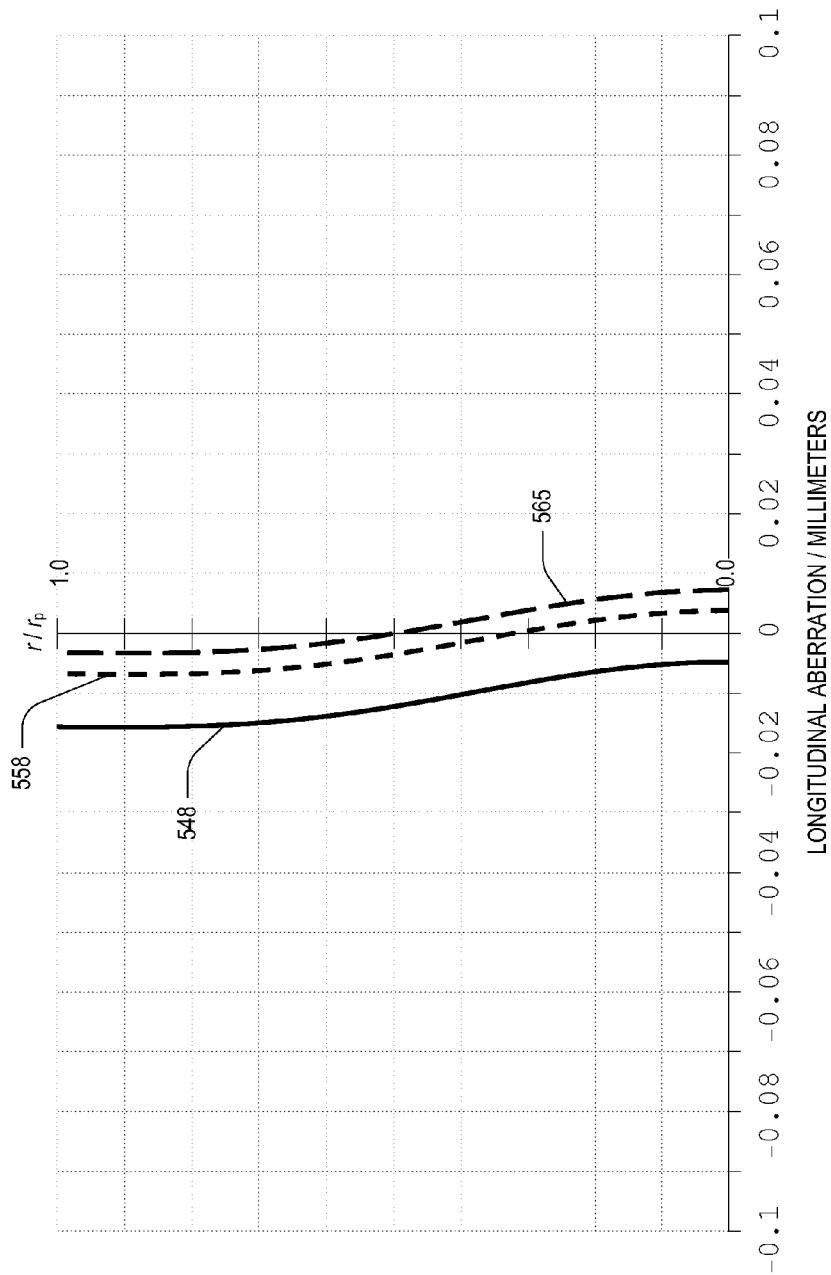
FIG. 5 is a plot of the longitudinal aberration of the FPAAAF lens within the imaging system of FIG. 3.

FIG. 5 is a plot of the longitudinal aberration of FPAAAF lens 300 within imaging system 350. In FIG. 5, longitudinal aberration is plotted in units of millimeters as a function of normalized radial coordinate $r/r_p$, where $r_p$=0.2793 mm is the maximum entrance pupil radius. Longitudinal aberration curves 548, 558, and 565 are computed at the blue, green, and red Fraunhofer F-, D- and C-spectral lines: $\lambda_F$=486.1 nm, $\lambda_D$=589.3 nm, and $\lambda_C$=656.3 nm respectively.

Figure 6:
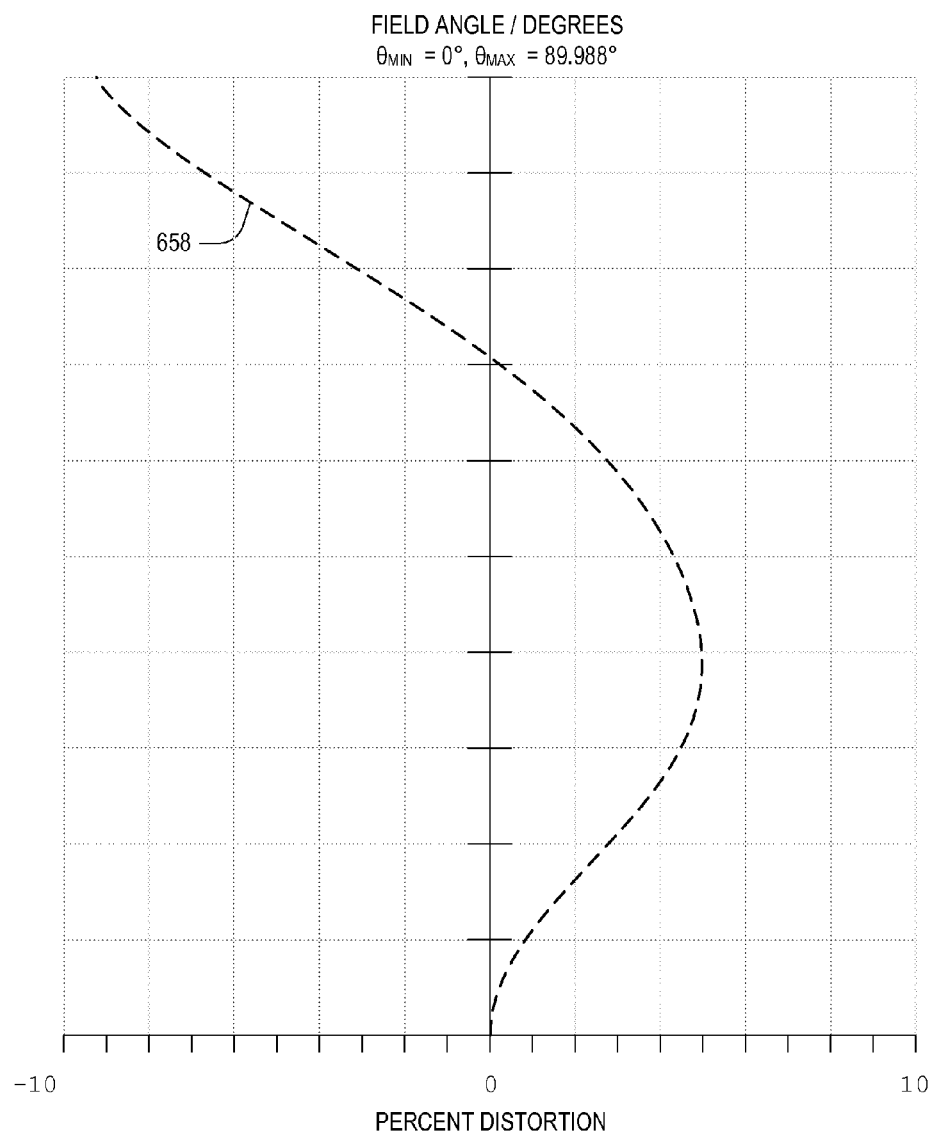
FIG. 6 is a plot of the f-Theta distortion of the FPAAAF lens within the imaging system of FIG. 3.

FIG. 6 is a plot of the f-Theta distortion, versus field angle, of FPAAAF lens 300 within imaging system 350. The maximum field angle plotted in FIG. 6 is $\theta_{max}$=89.998°. Distortion curve 658 is computed at wavelength $\lambda_D$. For clarity, distortion curves corresponding to wavelength $\lambda_F$ and $\lambda_C$ are not shown, as they overlap distortion curve 658 to within its line thickness as plotted in FIG. 6.

Figure 7:
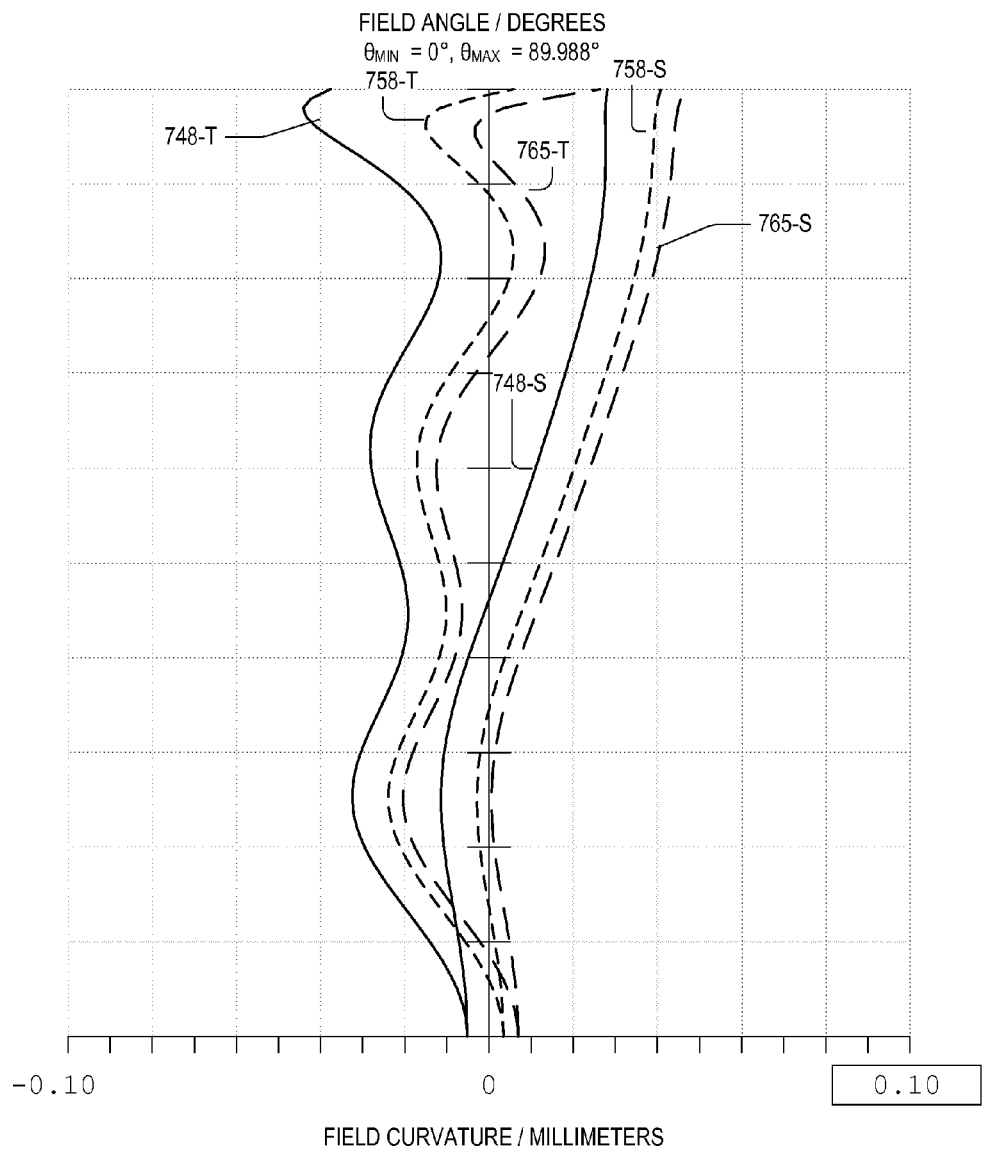
FIG. 7 is a plot of the Petzval field curvature of the FPAAAF lens within the imaging system of FIG. 3.

FIG. 7 is a plot of the Petzval field curvature of TPAAAF lens 300 as a function of field angle of FPAAAF lens 300 within imaging system 350. The field curvature is plotted for field angles between zero and is $\theta_{max}$=89.998°. Field curvature 748-S and field curvature 748-T (solid lines) are computed at wavelength $\lambda_F$ in the sagittal and tangential planes, respectively. Field curvature 758-S and field curvature 758-T (short-dashed lines) are computed at wavelength $\lambda_D$ in the sagittal and tangential planes, respectively. Field curvature 765-S and field curvature 765-T (long-dashed lines) correspond to field curvature at wavelength $\lambda_C$ in the sagittal and tangential planes, respectively.

Figure 8:
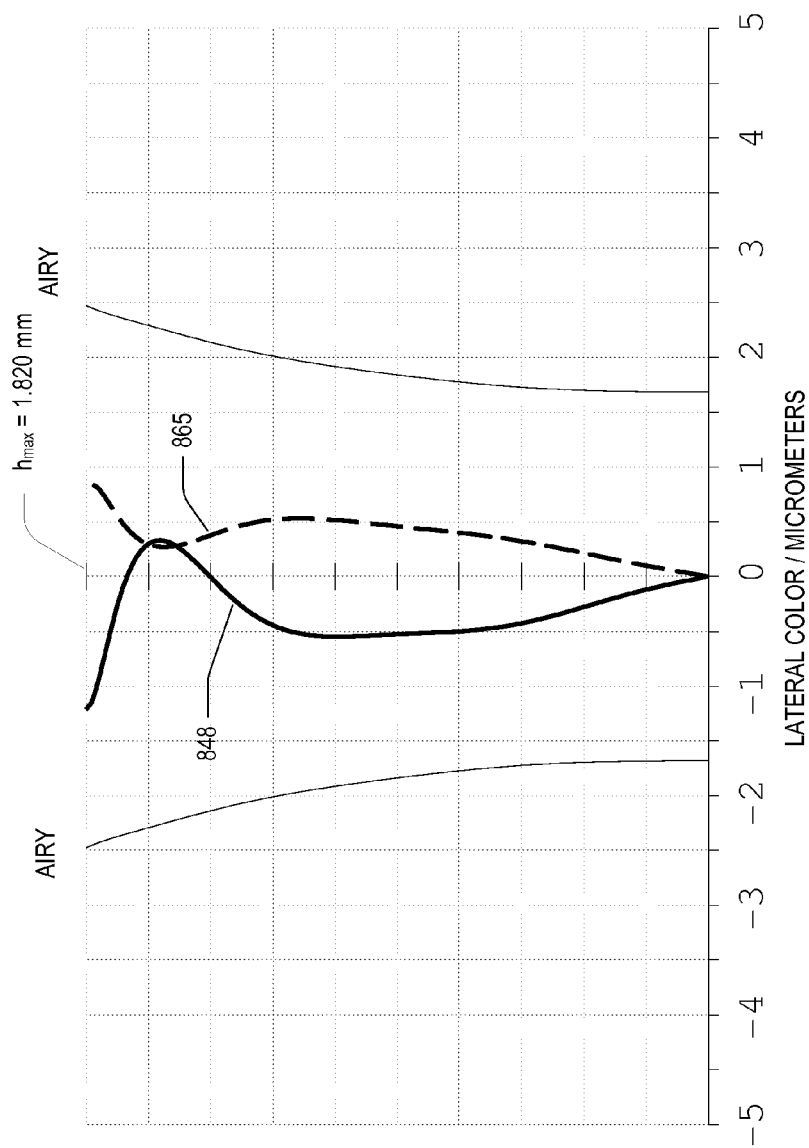
FIG. 8 is a plot of the lateral color error of the FPAAAF lens within the imaging system of FIG. 3.

FIG. 8 is a plot of the lateral color error, also known as transverse chromatic aberration, versus field height of FPAAAF lens 300 within imaging system 350. Field height ranges from $h_{min}$=0 (on-axis) to $h_{max}$=1.820 mm in image plane 352. Lateral color is referenced to $\lambda_D$: the lateral color for $\lambda_D$ is zero for all field heights. Lateral color 848 is computed at wavelength $\lambda_F$. Lateral color 865 is computed at wavelength $\lambda_C$. The lateral color error is less than the Airy disk radius for the range of field heights evaluated.

FPAAAF Lens

Example 2

Figure 9:
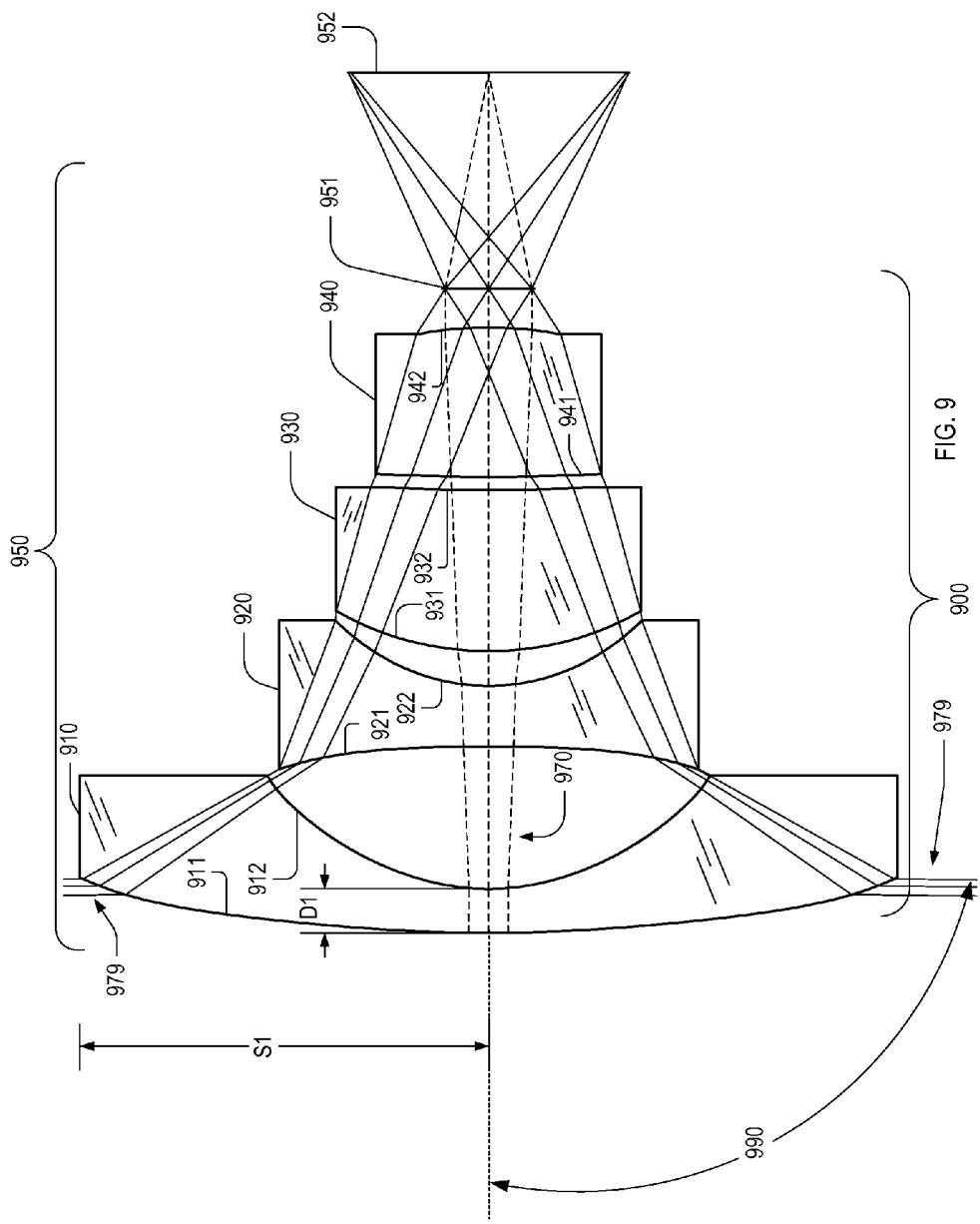
FIG. 9 is a cross-sectional view of a FPAAAF lens functioning as an adapter lens for an imaging system, in an embodiment.

FIG. 9 is a cross-sectional view of a FPAAAF lens 900 functioning as an adapter lens for an imaging system, e.g., for a standard non-fisheye imaging system included in mobile phone 150, FIG. 1. FPAAAF lens 900 is an embodiment of FPAAAF lens 200. FPAAAF lens 900 includes a negative meniscus lens 910, a biconcave lens 920, a positive meniscus lens 930, and a biconvex lens 940 that are analogous to negative meniscus lens 210, biconcave lens 220, positive meniscus lens 230, and biconvex lens 240 of FPAAAF lens 200. Negative meniscus lens 910 includes an object-side surface 911 and an image-side surface 912. Biconcave lens 920 includes an object-side surface 921 and an image-side surface 922. Positive meniscus lens 930 includes an object-side surface 931 and an image-side surface 932. Biconvex lens 940 includes an object-side surface 941 and an image-side surface 942. In FPAAAF lens 900, each of the surfaces 911, 912, 921, 922, 931, 932, 941, and 942 are aspheric.

Specifically, FPAAAF lens 900 is shown coupled with a camera lens 951 of the standard non-fisheye imaging system such that, collectively, FPAAAF lens 900 and camera lens 951 cooperatively form an image at image plane 952.

FPAAAF lens 900 is variably locatable with respect to a camera lens 951. In FIG. 9, the entrance pupil of camera lens 951 is located at the exit pupil of FPAAAF lens 900, resulting in an imaging system 950. In imaging system 950, the entrance pupil of camera lens 951 and the exit pupil of FPAAAF lens 900 are coaxial and coplanar.

Camera lens 951 is, for example, an imaging lens of a reflowable camera module mounted on a PCB of an imaging device. For the purpose of characterizing the aberrations caused by FPAAAF lens 900, in FIG. 9 camera lens 951 is modeled as an aberration-free "perfect lens" with a 66° field of view. Camera lens 951 is similar to camera lens 351.

Imaging system 950 is shown with ray traces of ray pencils 970 and 979 computed and displayed by the Zemax® Optical Design Program. Ray pencil 970 and ray pencil 979 propagate from the center and edge of the scene, respectively, through FPAAAF lens 900 and camera lens 951, and focus at image plane 952. Ray pencil 970 has a ray angle of zero. Ray pencil 979 has a ray angle 990 equal to 90°. Being axially symmetric, imaging system 950 has a field of view that is twice ray angle 990, or 180°.

FIG. 10 shows parameters of each surface of FPAAAF lens 900. Surface column 1011 denotes surfaces 911, 912, 921, 922, 931, 932, 941, 942, camera lens 951, and image plane 952 shown in FIG. 9. Meniscus lens 910 has refractive index $n_D$=1.543, Abbe number $V_D$=57, and includes surface 911 and surface 912. Biconcave lens 920 has refractive index $n_D$=1.543, Abbe number $V_D$=57, and includes surface 921 and surface 922. Positive meniscus lens 930 has refractive index $n_D$=1.585, Abbe number $V_D$=30, and includes object-side surface 931 and image-side surface 932. Biconvex lens 940 has refractive index $n_D$=1.523, Abbe number $V_D$=52, and includes object-side surface 941 and image-side surface 942.

Column 1013 contains thickness values, in millimeters, between surfaces 911, 912, 921, 922, 931, 932, 941, and 942. Surfaces 911, 912, 921, 922, 931, and 932 are defined by $z_{sag}$, Eqn. 1. Columns 1012, 1014, 1015, 1016, 1004, 1006, 1008, and 1010 are similar to columns 412, 414, 415, 416, 404, 406, 408, and 410, respectively, of FIG. 4.

Referring to meniscus lens 910, FIG. 9, the semi-diameter of the object side of meniscus lens 910 is S1 and the on-axis thickness of meniscus lens 910 is D1. The ratio S1/D1=9.7.

Meniscus lens 910 is a negative lens with a focal length F1=−6.544 mm. Object-side surface 911 has radius of curvature R1=19.591. The ratio F1/R1=−0.334.

Referring to biconcave lens 920, FIG. 9, object-side surface 921 has radius of curvature R3=−30.653 mm and image-side surface 922 has radius of curvature R4=2.755 mm. The ratio R4/R3=−0.0899.

Referring to positive meniscus lens 930, FIG. 9, object-side surface 931 has a radius of curvature R5=4.110, and image-side surface 942 has a radius of curvature R6 the exceeds R5 (R6=20.739).

Referring to biconvex lens 940, FIG. 9, object-side surface 941 has radius of curvature R7=20.833 and image-side surface 942 has radius of curvature R8=−5.090. The ratio R8/R7=−0.2443.

FIGS. 11-14 are plots of longitudinal aberration, f-Theta distortion, field curvature, and lateral color, respectively, of FPAAAF lens 900 within imaging system 950 as computed by Zemax®. Since camera lens 951 does not contribute to the aberrations shown in FIG. 11-14, the FPAAAF lens 900 is the source of these aberrations.

Figure 11:
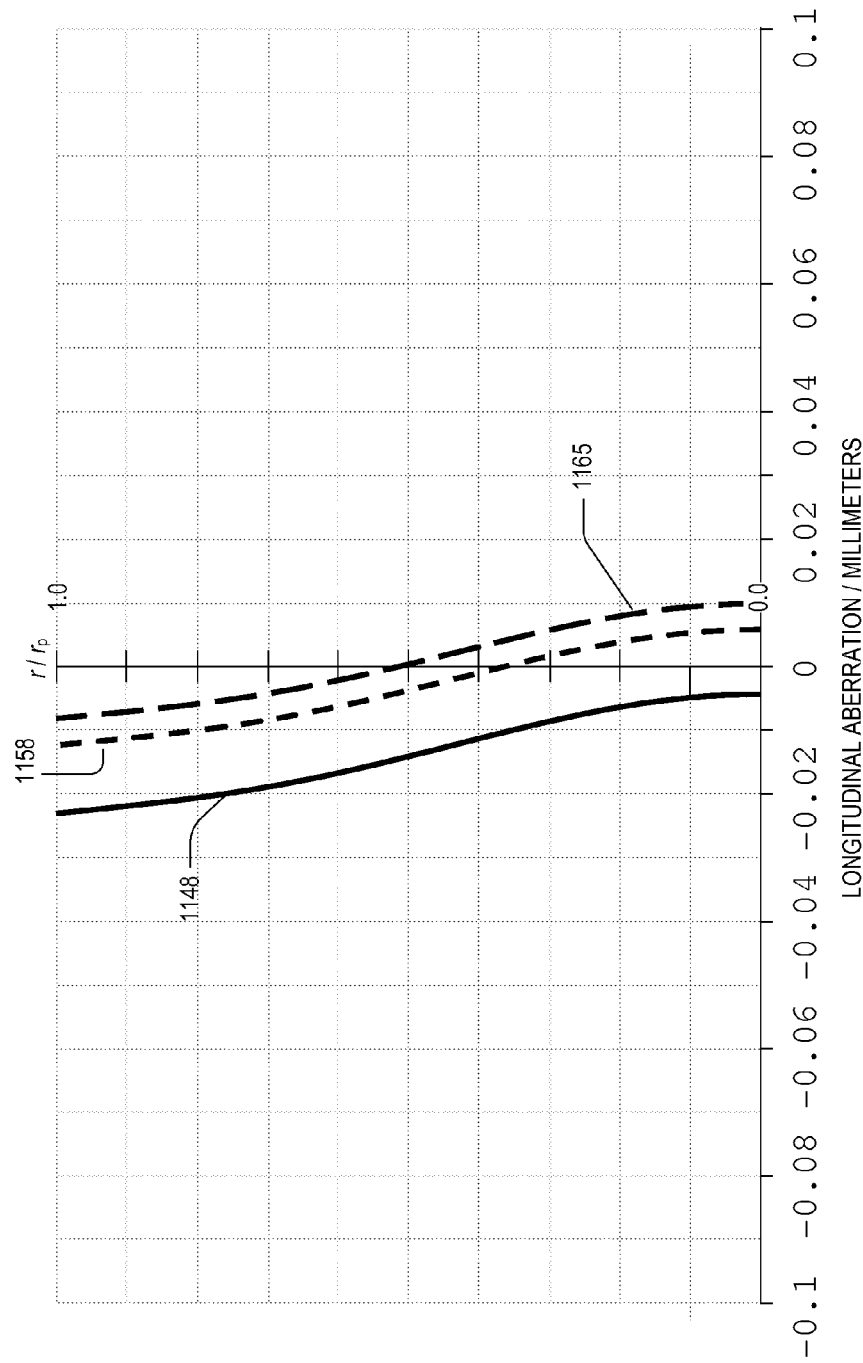
FIG. 11 is a plot of the longitudinal aberration of the FPAAAF lens within the imaging system of FIG. 9.

FIG. 11 is a plot of the longitudinal aberration of FPAAAF lens 900 within imaging system 950. In FIG. 11, longitudinal aberration is plotted in units of millimeters as a function of normalized radial coordinate $r/r_p$, where $r_p$=0.2793 mm is the maximum entrance pupil radius. Longitudinal aberration curves 1148, 1158, and 1165 are computed at $\lambda_F$, $\lambda_D$, and $\lambda_C$ respectively.

Figure 12:
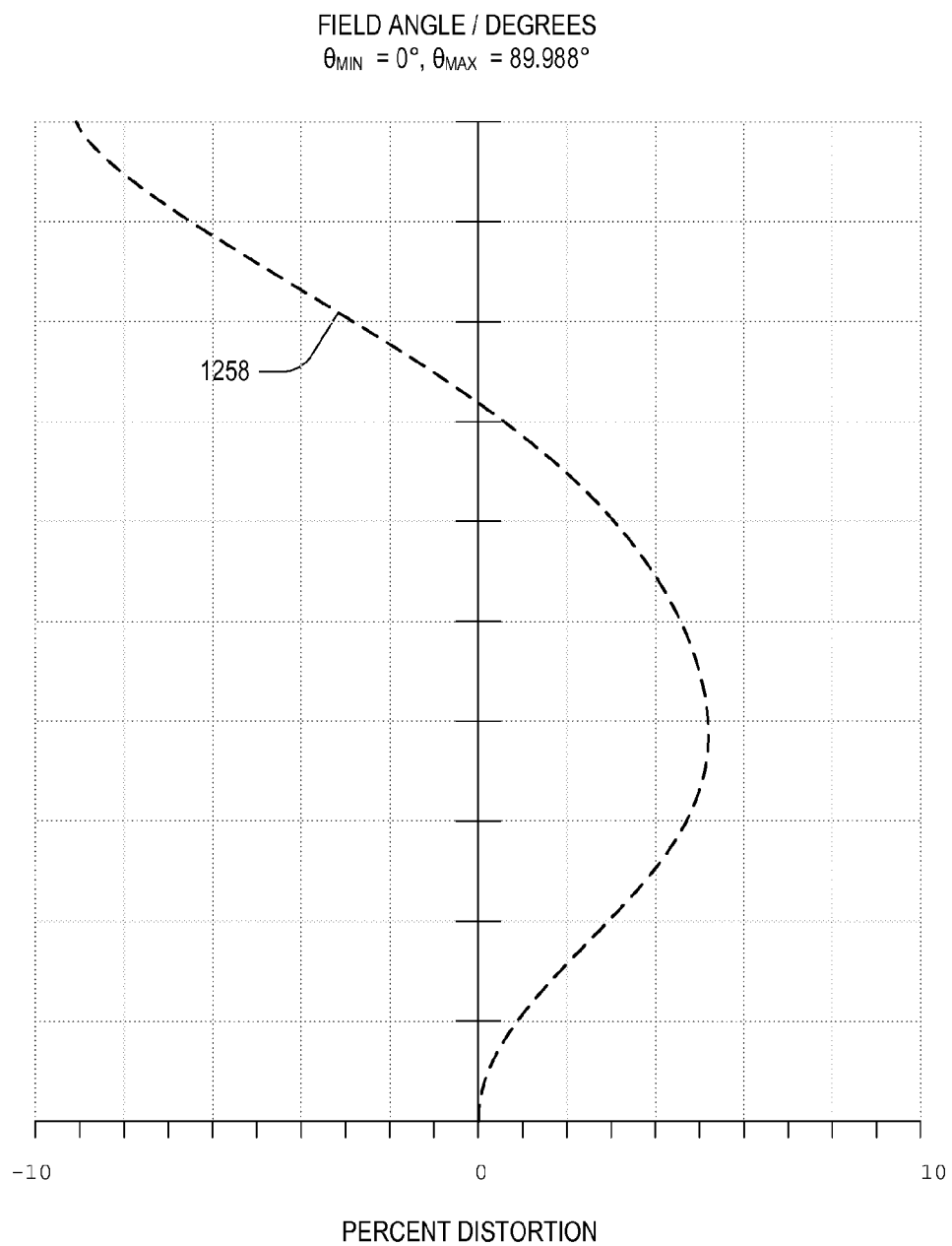
FIG. 12 is a plot of the f-Theta distortion of the FPAAAF lens within the imaging system of FIG. 9.

FIG. 12 is a plot of the f-Theta distortion, versus field angle, of FPAAAF lens 900 within imaging system 950. The f-Theta distortion is plotted for field angles between zero and is $\theta_{max}$=89.998°. Distortion curve 1258 is computed at wavelength $\lambda_D$. For clarity, distortion curves corresponding to wavelength $\lambda_F$ and $\lambda_C$ are not shown, as they overlap distortion curve 1258 to within its line thickness as plotted in FIG. 12.

Figure 13:
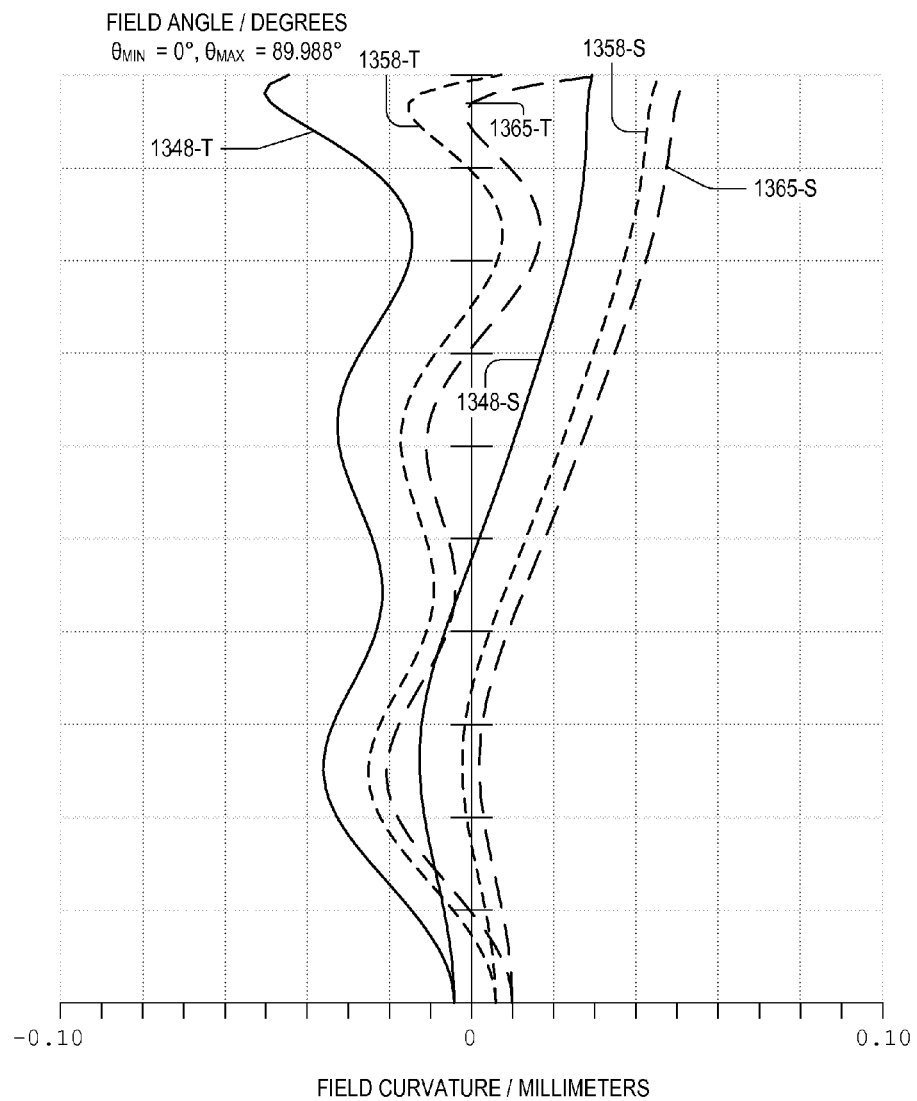
FIG. 13 is a plot of the Petzval field curvature of the FPAAAF lens within the imaging system of FIG. 9.

FIG. 13 is a plot of the Petzval field curvature as a function of field angle of FPAAAF lens 900 within imaging system 950. The field curvature is plotted for field angles between zero and is $\theta_{max}$=89.998°. Field curvature curves 1348-S and 1348-T (solid lines) are computed at wavelength $\lambda_F$ in the sagittal and tangential planes, respectively. Field curvature curves 1358-S and 1358-T (short-dashed lines) are computed at wavelength $\lambda_D$ in the sagittal and tangential planes, respectively. Field curvature curves 1365-S and 1365-T (long-dashed lines) correspond to field curvature at wavelength $\lambda_C$ in the sagittal and tangential planes, respectively.

Figure 14:
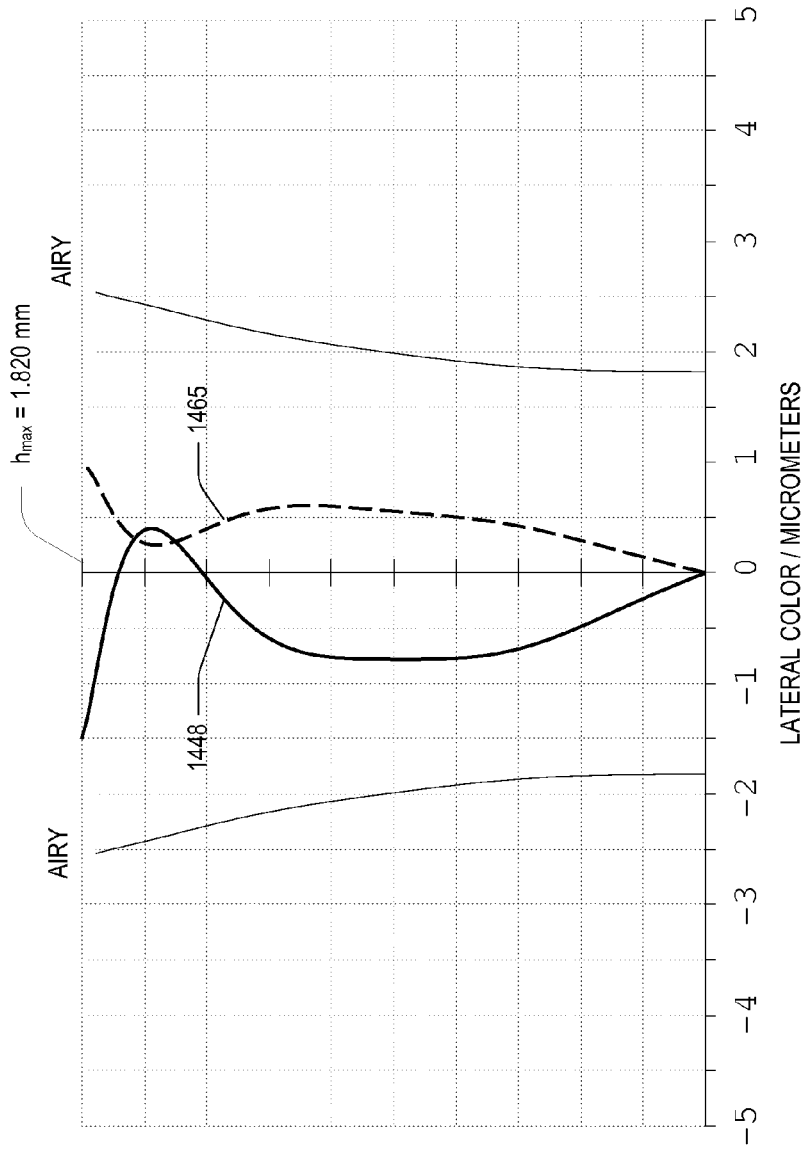
FIG. 14 is a plot of the lateral color error of the FPAAAF lens within the imaging system of FIG. 9.

FIG. 14 is a plot of the lateral color error versus field height of FPAAAF lens 900 within imaging system 950. Field height ranges from $h_{min}$=0 (on-axis) to $h_{max}$=1.820 mm in image plane 952. Lateral color is referenced to $\lambda_D$: the lateral color for $\lambda_D$ is zero for all field heights. Lateral color 1448 is computed at wavelength $\lambda_F$. Lateral color 1465 is computed at wavelength $\lambda_C$. Lateral color 1448 and lateral color 1465 are each less than the Airy disk radius for the full range of field heights evaluated.

Combinations of Features

Features described above as well as those claimed below may be combined in various ways without departing from the scope hereof. For example, it will be appreciated that aspects of FPAAAF lens described herein may incorporate or swap features of another FPAAAF lens described herein. The following examples illustrate possible, non-limiting combinations of embodiments described above. It should be clear that many other changes and modifications may be made to the methods and device herein without departing from the spirit and scope of this invention:

(A1) A four-piece all-aspheric adapter fisheye (FPAAAF) lens, the FPAAAF lens comprising a negative meniscus lens, a biconcave lens, a positive meniscus lens, and a biconvex lens. The biconcave lens is between the negative meniscus lens and the positive meniscus lens; the positive meniscus lens is between the biconcave lens and the biconvex lens. The negative meniscus lens, the biconcave lens, the positive meniscus lens, and the biconvex lens are coaxial and arranged with an exit pupil to cooperatively generate an image with a camera lens that has greater field of view than the camera lens alone when the exit pupil is coplanar and coaxial with an entrance pupil of the camera lens. Each of the negative meniscus lens, the biconcave lens, the positive meniscus lens, and the biconvex lens has an aspheric object-side surface and an aspheric image-side surface.

(A2) In the FPAAAF lens denoted as (A1), each of the negative meniscus lens, the biconcave lens, the positive meniscus lens, and the biconvex lens is a singlet lens.

(A3) In either of the FPAAAF lenses denoted as (A1) or (A2), the camera lens has a first field of view less than 90 degrees; the negative meniscus lens, biconcave lens, positive meniscus lens, biconvex lens, and the camera lens cooperatively have a second field of view exceeding 170 degrees.

(A4) In any of the FPAAAF lenses denoted as (A1) through (A3), each of the negative meniscus lens, the biconcave lens, the positive meniscus lens, and the biconvex lens is formed of a plastic material.

(A5) In any of the FPAAAF lenses denoted as (A1) through (A4), each of the negative meniscus lens, the biconcave lens, the positive meniscus lens, and the biconvex lens is injection molded.

(A6) In any of the FPAAAF lenses denoted as (A1) through (A5), the negative meniscus lens has a thickness D1 and the object-side surface has a semi-diameter S1, wherein ratio S1/D1 satisfies 9.0<S1/D1<9.8.

(A7) In any of the FPAAAF lenses denoted as (A1) through (A6), the negative meniscus lens has a focal length F1 and the object-side surface has a radius of curvature R1; wherein ratio F1/R1 satisfies −0.4<F1/R1<−0.3.

(A8) In any of the FPAAAF lenses denoted as (A1) through (A7), the object-side surface of the biconcave lens has a radius of curvature R3; the image-side surface of the biconcave lens has a radius of curvature R4; wherein ratio R4/R3 satisfies −0.12<R4/R3<−0.04.

(A9) In any of the FPAAAF lenses denoted as (A1) through (A8), the object-side surface of the positive meniscus lens has a positive radius of curvature R5; the image-side surface of the positive meniscus lens has a positive radius of curvature R6, wherein R6 exceeds R5.

(A10) In any of the FPAAAF lenses denoted as (A1) through (A9), the object-side surface of the biconvex lens has a radius of curvature R7; the image-side surface of the biconvex lens has a radius of curvature R8; wherein ratio R8/R7 satisfies −0.28<R8/R7<−0.20.

(A11) In any of the FPAAAF lenses denoted as (A1) through (A10), the negative meniscus lens and biconcave lens each have an Abbe number exceeding 55, and the positive meniscus lens has an Abbe number less than 35, for reducing chromatic aberration. Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A four-piece all-aspheric adapter fisheye (FPAAAF) lens, comprising:
   a negative meniscus lens, a biconcave lens, a positive meniscus lens, and a biconvex lens;
   the biconcave lens being between the negative meniscus lens and the positive meniscus lens; the positive meniscus lens being between the biconcave lens and the biconvex lens;
   the negative meniscus lens, the biconcave lens, the positive meniscus lens, and the biconvex lens being coaxial and arranged with an exit pupil to cooperatively generate an image with a camera lens that has greater field of view than the camera lens alone when the exit pupil is coplanar and coaxial with an entrance pupil of the camera lens; and
   each of the negative meniscus lens, the biconcave lens, the positive meniscus lens, and the biconvex lens having an aspheric object-side surface and an aspheric image-side surface.

2. The FPAAAF lens of claim 1, each of the negative meniscus lens, the biconcave lens, the positive meniscus lens, and the biconvex lens being a singlet lens.

3. The FPAAAF lens of claim 1,
   the camera lens having a first field of view less than 90 degrees;
   the negative meniscus lens, biconcave lens, positive meniscus lens, biconvex lens, and the camera lens cooperatively having a second field of view exceeding 170 degrees.

4. The FPAAAF lens of claim 1, each of the negative meniscus lens, the biconcave lens, the positive meniscus lens, and the biconvex lens being formed of a plastic material.

5. The FPAAAF lens of claim 1, each of the negative meniscus lens, the biconcave lens, the positive meniscus lens, and the biconvex lens being injection molded.

6. The FPAAAF lens of claim 1, the negative meniscus lens having a thickness D1 and the object-side surface having a semi-diameter S1, wherein ratio S1/D1 satisfies 9.0<S1/D1<9.8 for enabling a wide field of view.

7. The FPAAAF lens of claim 1, the negative meniscus lens having a focal length F1 and the object-side surface having a radius of curvature R1; wherein ratio F1/R1 satisfies −0.4<F1/R1<−0.3 for reducing distortion.

8. The FPAAAF lens of claim 1, the object-side surface of the biconcave lens having a radius of curvature R3; the image-side surface of the biconcave lens having a radius of curvature R4; wherein ratio R4/R3 satisfies −0.12<R4/R3<−0.04 for reducing field curvature.

9. The FPAAAF lens of claim 1, the object-side surface of the positive meniscus lens having a positive radius of curvature R5; the image-side surface of the positive meniscus lens having a positive radius of curvature R6, wherein R6 exceeds R5 for reducing chromatic aberration.

10. The FPAAAF lens of claim 1, the object-side surface of the biconvex lens having a radius of curvature R7; the image-side surface of the biconvex lens having a radius of curvature R8; wherein ratio R8/R7 satisfies −0.28<R8/R7<−0.20 for reducing longitudinal aberration.

11. The FPAAAF lens of claim 1, the negative meniscus lens and biconcave lens each having an Abbe number exceeding 55, and the positive meniscus lens having an Abbe number less than 35, for reducing chromatic aberration.

12. A four-piece all-aspheric adapter fisheye (FPAAAF) lens, comprising:
    a negative meniscus lens, a biconcave lens, a positive meniscus lens, and a biconvex lens;
    the biconcave lens being between the negative meniscus lens and the positive meniscus lens; the positive meniscus lens being between the biconcave lens and the biconvex lens;
    the negative meniscus lens, the biconcave lens, the positive meniscus lens, and the biconvex lens being coaxial and arranged with an exit pupil to cooperatively generate an image with a camera lens that has greater field of view than the camera lens alone when the exit pupil is coplanar and coaxial with an entrance pupil of the camera lens;
    each of the negative meniscus lens, the biconcave lens, the positive meniscus lens, and the biconvex lens having an aspheric object-side surface and an aspheric image-side surface;

the negative meniscus lens having a thickness D1 and the object-side surface having a semi-diameter S1, wherein ratio S1/D1 satisfies 9.0<S1/D1<9.8 for enabling a wide field of view;

the negative meniscus lens having a focal length F1 and the object-side surface having a radius of curvature R1; wherein ratio F1/R1 satisfies 0.4<F1/R1<0.3 for reducing distortion;

the object-side surface of the biconcave lens having a radius of curvature R3; the image-side surface of the biconcave lens having a radius of curvature R4; wherein ratio R4/R3 satisfies 0.12<R4/R3<0.04 for reducing field curvature;

the object-side surface of the positive meniscus lens having a positive radius of curvature R5; the image-side surface of the positive meniscus lens having a positive radius of curvature R6 exceeds R5 for reducing chromatic aberration;

the object-side surface of the biconvex lens having a radius of curvature R7; the image-side surface of the biconvex lens having a radius of curvature R8; wherein ratio R8/R7 satisfies 0.28<R8/R7<−0.2 for reducing longitudinal aberration; and the negative meniscus lens and biconcave lens each having an Abbe number exceeding 55, and the positive meniscus lens having an Abbe number less than 35, for reducing chromatic aberration.

13. The FPAAAF lens of claim 12, each of the negative meniscus lens, the biconcave lens, the positive meniscus lens, and the biconvex lens being a singlet lens.

14. The FPAAAF lens of claim 12,
the camera lens having a first field of view less than 90 degrees;
the negative meniscus lens, the biconcave lens, the positive meniscus lens, the biconvex lens, and the camera lens cooperatively having a second field of view exceeding 170 degrees.

15. The FPAAAF lens of claim 12, each of the negative meniscus lens, the biconcave lens, the positive meniscus lens, and the biconvex lens being formed of a plastic material.

16. The FPAAAF lens of claim 12, each of the negative meniscus lens, the biconcave lens, the positive meniscus lens, and the biconvex lens being injection molded.

17. A four-piece all-aspheric adapter fisheye (FPAAAF) lens, comprising:
a negative meniscus lens, a biconcave lens, a positive meniscus lens, and a biconvex lens;
the biconcave lens being between the negative meniscus lens and the positive meniscus lens; the positive meniscus lens being between the biconcave lens and the biconvex lens;
the negative meniscus lens, the biconcave lens, the positive meniscus lens, and the biconvex lens being coaxial and arranged with an exit pupil to cooperatively generate an image with a camera lens that has greater field of view than the camera lens alone when the exit pupil is coplanar and coaxial with an entrance pupil of the camera lens; and each of the negative meniscus lens, the biconcave lens, the positive meniscus lens, and the biconvex lens having an aspheric object-side surface and an aspheric image-side surface;

the camera lens having a first field of view less than 90 degrees;

the negative meniscus lens, the biconcave lens, the positive meniscus lens, the biconvex lens, and the camera lens cooperatively having a second field of view exceeding 170 degrees;

each of the negative meniscus lens, the biconcave lens, the positive meniscus lens, and the biconvex lens being a singlet lens;

each of the negative meniscus lens, the biconcave lens, the positive meniscus lens, and the biconvex lens being formed of a plastic material;

each of the negative meniscus lens, the biconcave lens, the positive meniscus lens, and the biconvex lens being injection molded;

the negative meniscus lens having a thickness D1 and the object-side surface having a semi-diameter S1, wherein ratio S1/D1 satisfies 9.0<S1/D1<9.8 for enabling a wide field of view;

the negative meniscus lens having a focal length F1 and the object-side surface having a radius of curvature R1; wherein ratio F1/R1 satisfies 0.4<F1/R1<0.3 for reducing distortion;

the object-side surface of the biconcave lens having a radius of curvature R3; the image-side surface of the biconcave lens having a radius of curvature R4; wherein ratio R4/R3 satisfies 0.12<R4/R3<0.04 for reducing field curvature;

the object-side surface of the positive meniscus lens having a positive radius of curvature R5; the image-side surface of the positive meniscus lens having a positive radius of curvature R6 exceeds R5 for reducing chromatic aberration;

the object-side surface of the biconvex lens having a radius of curvature R7; the image-side surface of the biconvex lens having a radius of curvature R8; wherein ratio R8/R7 satisfies 0.28<R8/R7<−0.2 for reducing longitudinal aberration;

the negative meniscus lens and biconcave lens each having an Abbe number exceeding 55, and the positive meniscus lens having an Abbe number less than 35, for reducing chromatic aberration.

* * * * *